United States Patent
Weaver

[15] 3,669,153
[45] June 13, 1972

[54] PIPE CAP

[72] Inventor: Cletus Weaver, 1215 Spring Street, Michigan City, Ind. 46360

[22] Filed: Sept. 29, 1969

[21] Appl. No.: 861,857

[52] U.S. Cl. ............................................. 138/89, 138/89.4
[51] Int. Cl. ........................................................ F16l 57/00
[58] Field of Search ........................... 138/89, 89.4, 46, 109

[56] References Cited

UNITED STATES PATENTS

| 1,506,005 | 8/1924 | Kraft | 138/89.4 |
| 2,155,491 | 4/1939 | Jacobs | 138/89 |
| 2,512,041 | 6/1950 | Steele | 138/89 X |
| 2,873,765 | 2/1959 | Gregory | 138/96 |
| 3,044,496 | 7/1962 | Maisch | 138/89 |

OTHER PUBLICATIONS

Product Engineering, " Removable Plugs Seal Pipe Ends," January 6, 1964, pp. 76–77.

*Primary Examiner*—Laverne D. Geiger
*Assistant Examiner*—Richard J. Sher
*Attorney*—John R. Nesbitt

[57] ABSTRACT

A device for capping a pipe, particularly for an underground pipe. This device serves to keep dirt, mud, water and the like from entering an underground pipe.

2 Claims, 1 Drawing Figure

PATENTED JUN 13 1972
3,669,153
INVENTOR.
CLETUS WEAVER
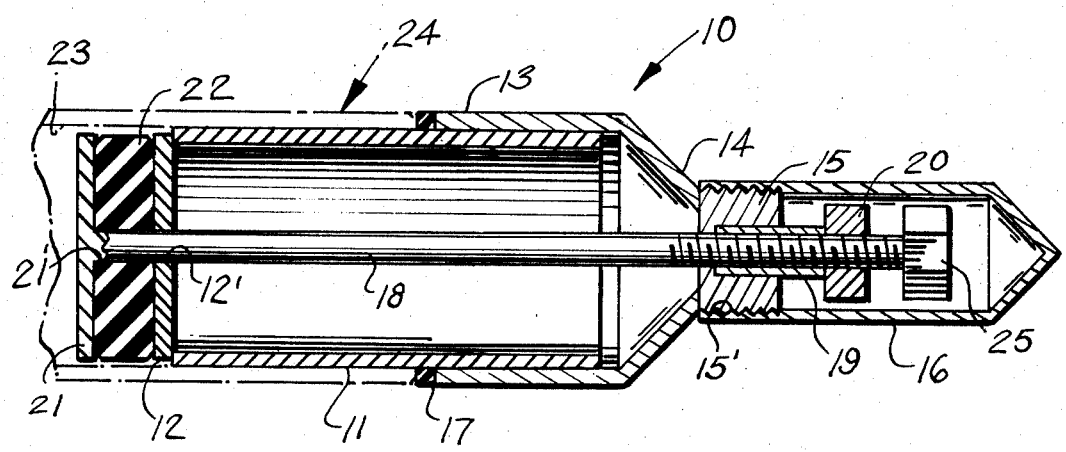

PIPE CAP

This invention relates to devices for closing the open ends of underground pipes.

It is therefore the main purpose of this invention to provide a pipe cap which will eliminate the necessity of welding a cap on the end of a pipe that is to be pulled through an opening under the street that has been augered.

Another object of this invention is to provide a pipe cap which will cap a pipe prior to pulling it through water and mud wherein the pipe has to be pulled through other pipe lines, under tile, or telephone lines and the like.

A further object of this invention is to provide a cap of the type described which will save the bevelled factory edge on the pipe thus enabling the butt ends of two pipes to be easily welded.

A still further object of this invention is to provide a cap which will have an expandable gasket which is compressed by tightening a nut on a rod in a pair of sleeves thus engaging the outer periphery of the gasket with the inner periphery of the pipe in order to prevent water and other debris from entering the open end of the pipe and the device will have screw cap means in order to protect the nut and thread portions of the device from water and the like.

Other objects of the present invention are to provide a pipe cap which is simple in design, inexpensive to manufacture, rugged in construction, easy to use and efficient in operation.

These and other objects will be readily evident upon a study of the following specification and the accompanying drawing wherein:

The drawing is the sole view of the present invention.

According to this invention, a pipe cap 10 is shown to include a sleeve 11 against which abutts at one end a plate 12 of circular configuration. Sleeve 11 is slidably received within sleeve 13, the opposite end of sleeve 13 is provided with a conical portion 14 having an externally threaded and projecting end wall 15. As nut 20 is rotated clockwise, sleeve 11 is drawn toward conical portion 14 of sleeve 13 and brought into abutting relation thereto. The internal threads 15' of cap 16 are threaded onto end wall 15 for a purpose which hereinafter will be described.

A gasket 17 of rubber material is fixedly secured to the open end of sleeve 13 and provides a water tight seal between sleeve 11 and sleeve 13. An elongated and threaded rod 18 is carried within pipe cap 10 and is in axial alignment with sleeves 11 and 13. Rod 18 is carried within bushing 19 which is fixedly secured within end wall 15 of sleeve 13 and a nut 20 is threaded onto rod 18 for the purpose of operating cap 10.

Rod 18 is also provided with a plate 21 which abutts with one side of gasket 22. Gasket 22 is of rubber or other suitable material that will expand when compressed. Rod 18 is freely received within opening 21' of gasket 22 and is freely received within opening 12' of plate 12.

When nut 20 is rotated it pulls plate 21 on the end of rod 18 towards plate 12 and gasket 22 being sandwiched between plate 21 and plate 12 will expand causing gasket 22 to engage the inner periphery 23 of pipe 24 thus preventing the seepage of water and foreign matter into pipe 24.

It shall be noted that gaskets 17 and 22 provide a double measure for preventing material from entering pipe 24 and gasket 17 abutts with the open end of pipe 24.

It shall also be noted that nut 25 being fixedly secured to the threaded end of rod 18 serves to prevent the rotation of gasket 22 and its related components when nut 20 is being rotated to expand gasket 22 against the inner periphery 23 of pipe 24.

It shall further be noted that the internally threaded cap 16 serves to prevent water, mud and the like from coating the threaded end of rod 18 and the nuts 20 and 25 by their being completely enclosed within cap 16.

What I now claim is:

1. A pipe cap for underground pipe comprising;
a pair of sleeve members;
one of said sleeve members having one end sized to match the inner and outer diameters of the pipe to be capped;
the other of said sleeve members being sized to slide longitudinally with respect to the inner diameter of said one sleeve member;
rod guide means in abutting relation to said other sleeve member;
gasket means carried on one end of said one sleeve member adapted for abutting contact with the end of the pipe to be capped;
threaded rod guide means carried on the other end of said one sleeve member with said other end of said one sleeve having an outer diameter of reduced size compared to said one end thereof;
a rod having a compression member on one end thereof and being threaded on the other end thereof, said rod being adapted to extend loosely through the rod guide means of said other sleeve member and to extend through said threaded rod guide means of said one sleeve member in threadable engagement therewith and having an operative portion on said one end of said rod which protrudes exteriorly of said one sleeve member;
an expansible annular ring having said rod freely extending through its bore, said ring being captured between the compression member carried by said rod and said rod guide means whereby rotation of said rod both compresses said ring, thereby forcing it into sealing engagement with the inner diameter of the pipe to be capped and compresses said gasket means between the end of the pipe and said one sleeve member.

2. The pipe cap according to claim 1 in which said other end of said one sleeve member has an exterior threaded portion thereon and a protective cap having an outer diameter less than that of the pipe being capped and a hollow interior chamber having a threaded portion adapted for threadable engagement with the exterior of said other end of said one sleeve member whereby water and foreign matter are prevented from contaminating the operative end of said rod, which operative end extends into the said interior chamber of said cap.

\* \* \* \* \*